(12) United States Patent
Nishida

(10) Patent No.: US 10,594,878 B2
(45) Date of Patent: Mar. 17, 2020

(54) INFORMATION PROCESSING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventor: Tomoyo Nishida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/121,089

(22) Filed: Sep. 4, 2018

(65) Prior Publication Data

US 2019/0075210 A1  Mar. 7, 2019

(30) Foreign Application Priority Data

Sep. 5, 2017  (JP) ................................ 2017-170612

(51) Int. Cl.
*H04N 1/00* (2006.01)
*G06F 3/01* (2006.01)
*G06F 3/0484* (2013.01)
*G06F 3/0488* (2013.01)

(52) U.S. Cl.
CPC ......... *H04N 1/00411* (2013.01); *G06F 3/013* (2013.01); *G06F 3/017* (2013.01); *H04N 1/00381* (2013.01); *G06F 3/04845* (2013.01); *G06F 3/04883* (2013.01)

(58) Field of Classification Search
None
See application file for complete search history.

(56) References Cited

U.S. PATENT DOCUMENTS

| 2009/0046075 | A1* | 2/2009 | Kim | ................... | G06F 3/0488 |
| | | | | | 345/173 |
| 2011/0219297 | A1 | 9/2011 | Oda | | |
| 2013/0176208 | A1* | 7/2013 | Tanaka | .................. | G06F 3/013 |
| | | | | | 345/156 |
| 2014/0189580 | A1* | 7/2014 | Kawamata | .......... | G06F 3/0488 |
| | | | | | 715/784 |
| 2016/0026244 | A1* | 1/2016 | Ogawa | .................. | G06F 3/013 |
| | | | | | 345/156 |

FOREIGN PATENT DOCUMENTS

JP  2011186742 A  9/2011

* cited by examiner

*Primary Examiner* — Frantz Bataille
(74) *Attorney, Agent, or Firm* — Sughrue Mion, PLLC

(57) ABSTRACT

An information processing apparatus includes: a display that displays an overlapping image including plural images which are partially overlapped and are mutually deviated; a gaze detection unit that detects a gaze of an operator, which is fixed on the overlapping image; a motion detection unit that detects a specific motion that is made when the operator performs an operation on the overlapping image; and a display control unit that changes an arrangement of the plural images included in the overlapping image in a case where the gaze fixed on the overlapping image is detected and where the specific motion is detected.

20 Claims, 15 Drawing Sheets

INFORMATION PROCESSING APPARATUS, IMAGE FORMING APPARATUS, AND NON-TRANSITORY COMPUTER READABLE MEDIUM

CROSS REFERENCE TO RELATED APPLICATION

This application is based on and claims priority under 35 USC 119 from Japanese Patent Application No. 2017-170612 filed Sep. 5, 2017.

BACKGROUND

Technical Field

The present invention relates to an information processing apparatus, an image forming apparatus, and a non-transitory computer readable medium.

Related Art

JP-A-2011-186742 discloses an apparatus that includes a detection unit that detects that one object overlaps with any other object, and a display unit that displays, when the detection unit detects that the one object overlaps with the any other object, the any other object shifting from its alignment position.

SUMMARY

In an information processing apparatus that includes a display unit, for example, an operator performs an operation on the display unit, and thus an image on the display unit is selected, or the image on the display unit is moved. At this point, for example, when images on the display unit are arranged in a manner that approaches each other, an error in an operation may occur. An image which is different from an image that is originally intended to be selected may be selected, or an image may be moved to a portion which is different from an originally intended portion.

Aspects of non-limiting embodiments of the present disclosure relate to reduce an error in an operation performed by an operator on an image which is displayed on a display unit, when the operator performs the operation on the image on the display unit, compared with a case where processing that changes an arrangement of images is not performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a display that displays an overlapping image including plural images which are partially overlapped and are mutually deviated; a gaze detection unit that detects a gaze of an operator, which is fixed on the overlapping image; a motion detection unit that detects a specific motion that is made when the operator performs an operation on the overlapping image; and a display control unit that changes an arrangement of the plural images included in the overlapping image in a case where the gaze fixed on the overlapping image is detected and where the specific motion is detected.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the accompanying drawings.

Figure 1:
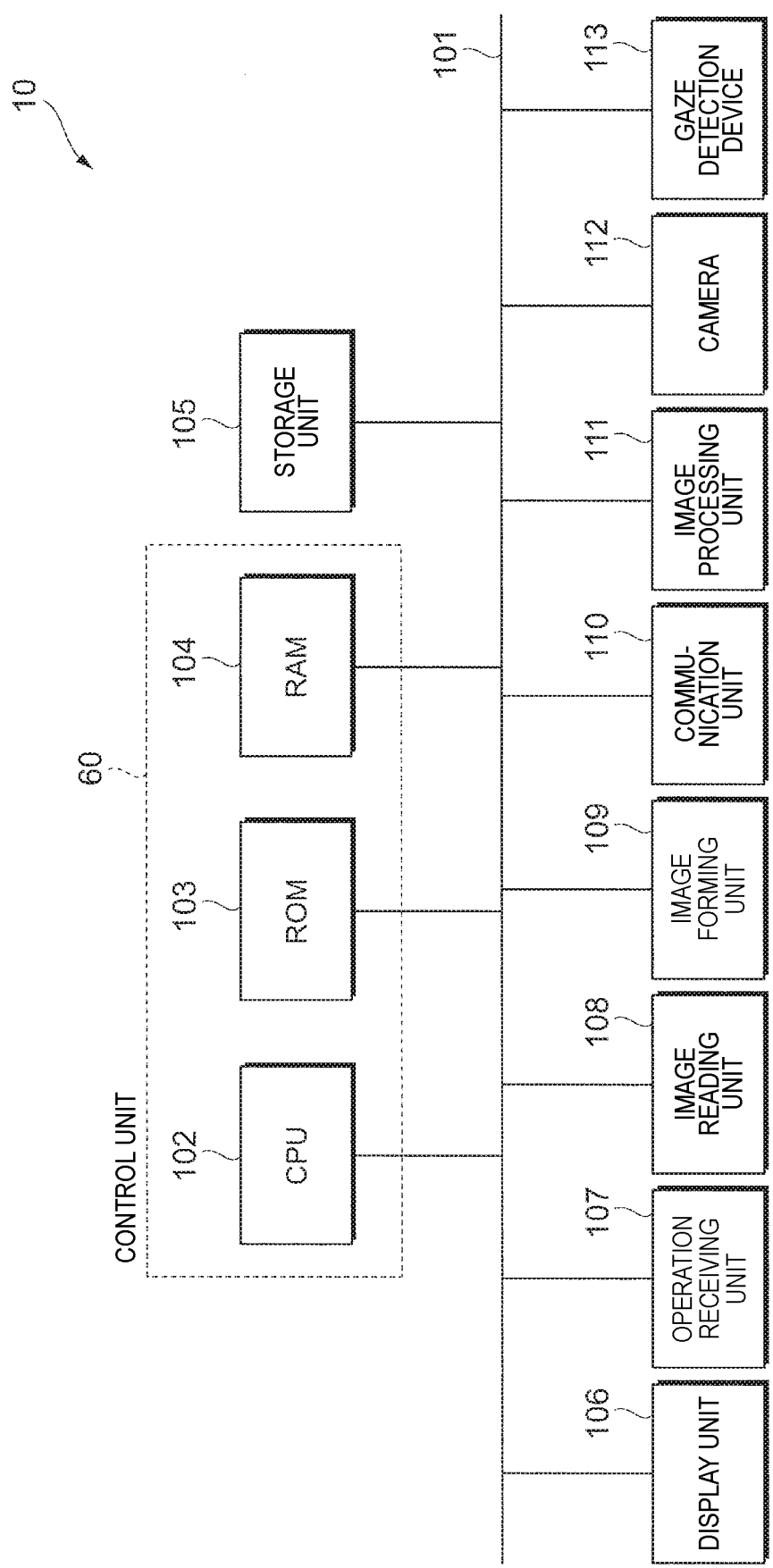
FIG. 1 is a diagram illustrating each function unit that constitutes an image forming apparatus.

FIG. 1 is a diagram illustrating each functional unit that constitutes an image forming apparatus 10 according to an exemplary embodiment.

Figure 2:
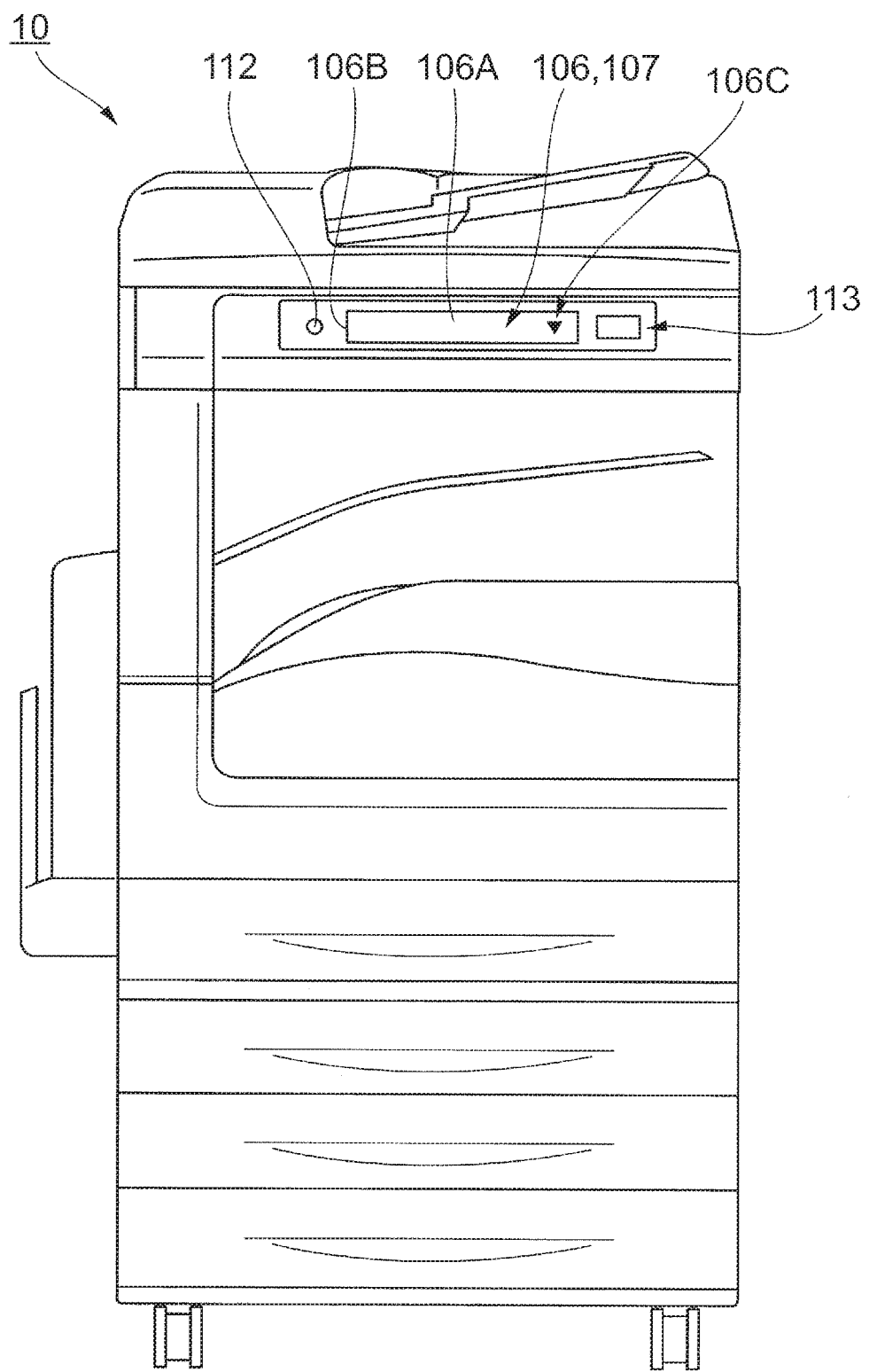
FIG. 2 is a front-view diagram of the image forming apparatus.

FIG. 2 is a front-view diagram of the image forming apparatus 10.

As illustrated in FIG. 1, each functional unit that constitutes the image forming apparatus 10 according to the present embodiment is connected to a bus 101, and performs data transmission and reception through the bus 101.

A display unit 106 as one example of a display displays an image and thus performs notification of information to an operator who operates the image forming apparatus 10. The display unit 106, as illustrated in FIG. 2, is formed in a rectangular shape. Moreover, the display unit 106 has a display screen 106A on which an image displayed, and a rim 106B that surrounds the display screen 106A.

An operation from a user is received by an operation receiving unit 107 (see FIGS. 1 and 2). Specifically, the user's operation with respect to display content that is displayed on the display unit 106 is received by the operation receiving unit 107.

At this point, the display unit 106 and the operation receiving unit 107, for example, are configured with a touch panel type display. The display unit 106 and the operation receiving unit 107 are arranged in such a manner as to be overlapped on each other in terms of shape.

It is noted that, in the present embodiment, the case where the operation receiving unit 107 is configured with the touch panel type display is described, but that the operation receiving unit 107 may be configured with a pointing device such as a mouse.

In this case, when a user operates the pointing device, a pointer 106C (see FIG. 2) moves that is displayed on display unit 106. Then, when the selection or the like of an image by the user is made, the pointer 106C is positioned on an image on the display unit 106, and then the user's operation (an operation such as clicking) with respect to the pointing device is performed.

The display unit 106 (see FIG. 1) is controlled by a control unit 60. Moreover, in the present embodiment, the user's operation with respect to the display content on the display unit 106 is received by the operation receiving unit 107.

Then, in the present embodiment, according to the user's operation that is received by the operation receiving unit 107, processing that corresponds to the operation is performed.

An image reading unit 108 (see FIG. 1) is configured with a so-called scanning apparatus, reads an image on an original document that is set, and generates a reading image (image data) of the original document.

The image forming unit 109 as one example of an image forming unit, for example, uses an electrographic method, and forms a toner image in accordance with the image data, a paper sheet that is one example of a recording material. It is noted that, in the image forming unit 109, image formation may be performed using any other method such as an ink jet head method. The communication unit 110 functions as a communication interface that is connected to a communication line (not illustrated) and performs communication with any other apparatus that is connected to the communication line.

An image processing unit 111 performs image processing, such as color correction or gray level correction, on an image that is represented by the image data.

The camera 112 is one example of an image capture unit, and image-captures a station in the vicinity of the image forming apparatus 10. Furthermore, in a case where an operator is standing in front of the image forming apparatus 10, the camera 112 image-captures the operator.

The camera 112 is configured with a Charge Coupled Device (CCD) or the like. The camera 112, as illustrated in FIG. 2, is installed on the front side of the image forming apparatus 10. Moreover, the camera 112 is positioned side by side with the display unit 106 (the operation receiving unit 107).

A gaze detection device 113 (see FIG. 1) detects a gage of the operator who performs operation of the image forming apparatus 10.

The gaze detection device 113, as illustrated in FIG. 2, is also installed on the front side of the image forming apparatus 10. Furthermore, the gaze detection device 113 is positioned side by side with the display unit 106 (the operation receiving unit 107).

For example, data that is received in the communication unit 110, or the reading image (the image data) that is generated in the image reading unit 108 is stored in a storage unit 105 (see FIG. 1) that is configured with a hard disk device or the like.

The control unit 60 controls each unit of the image forming apparatus 10. The control unit 60 is configured with a Central Processing Unit (CPU) 102, a Read Only Memory (ROM) 103, and a Random Access Memory (RAM) 104.

A program that is executed by the CPU 102 is stored in the ROM 103. The CPU 102 reads the program that is stored in the ROM 103, and executes the program with the RAM 104 as a working area.

At this point, the program that is executed by the CPU 102 may be provided to the image forming apparatus 10, in a state of being stored in a magnetic recording medium (such as a magnetic tape or a magnetic disk), an optical recording medium (such as an optical disc), a magneto-optical recording medium, a semiconductor memory, or the like, which is computer-readable.

Furthermore, the program that is executed by the CPU 102 may be downloaded to the image forming apparatus 10 using communication means such as the Internet.

When the program is executed by the CPU 102, each unit of the image forming apparatus 10 is controlled by the CPU 102, and thus, the image forming apparatus 10, for example, forms an image on a paper sheet, or reads an original document and generates a reading image of the original document.

Figure 3:
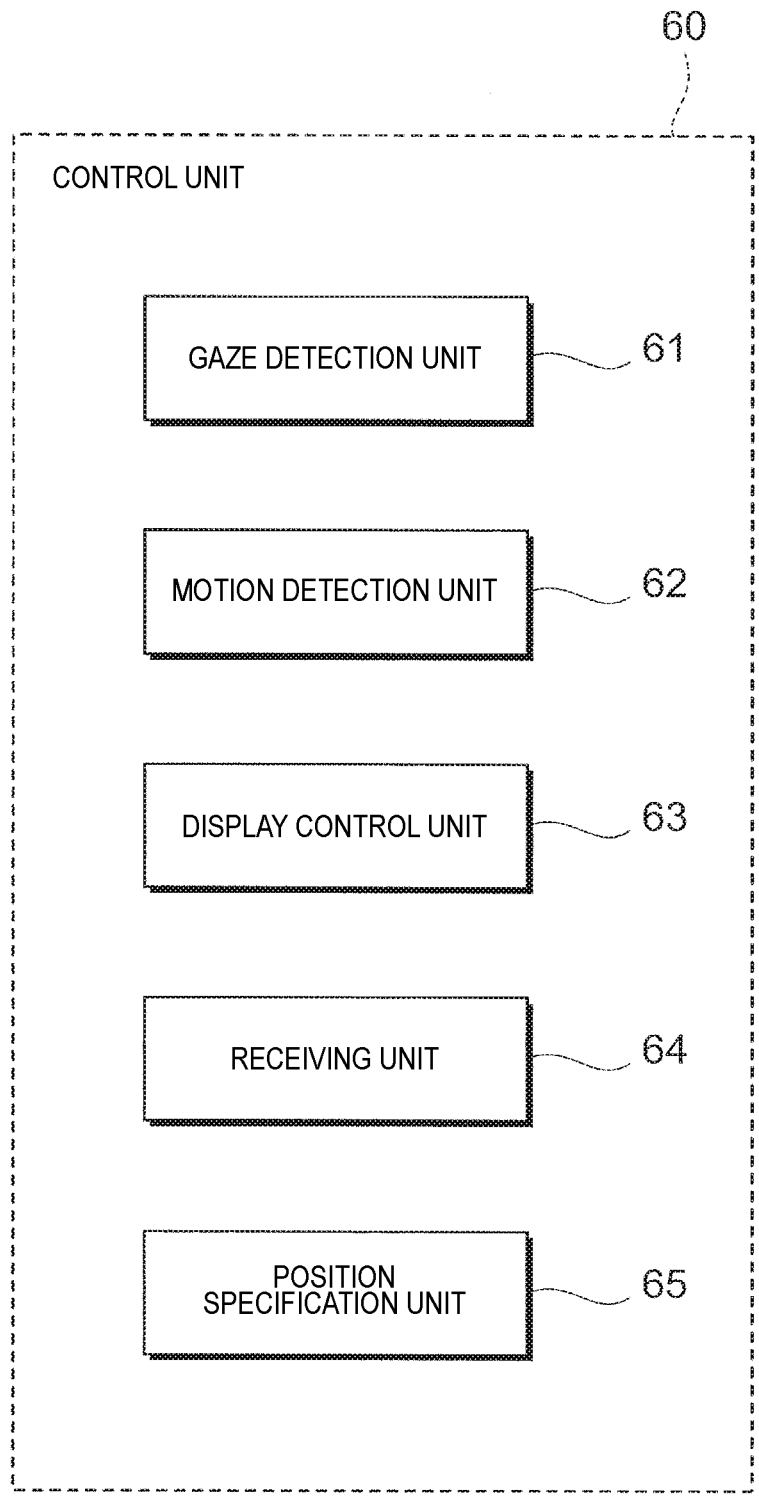
FIG. 3 is a block diagram illustrating a functional configuration of a control unit.

Furthermore, in the present embodiment, the program is executed by the CPU 102, and thus, as illustrated in FIG. 3 (which is a block diagram illustrating a functional configuration of the control unit 60), the control unit 60 functions as a gaze detection unit 61, a motion detection unit 62, a display control unit 63, a receiving unit 64, and a position specification unit 65.

At this point, the display unit 106 and the control unit 60 according to the present embodiment may be regarded as an information processing apparatus that performs image display.

The gaze detection unit 61 (see FIG. 3) as one example of a gaze detection unit detects an operator's gaze fixed on an overlapping image (which will be described below) that is displayed on the display unit 106.

Specifically, based on positional information indicating a position of the overlapping image on the display unit 106, and on an output from the gaze detection device 113, the gaze detection unit 61 detects the operator's gaze fixed on the overlapping image.

In other words, the gaze detection unit 61 determines whether or not the overlapping image is present on a destination of the operator's gaze, and, in a case where the overlapping image is present, outputs information to the effect that the operator is taking a look at the overlapping image.

The motion detection unit 62 as one example of an operation detection unit interprets an output from the camera 112 or the pointing device, and detects a specific motion that is made when the operator performs an operation on the overlapping image.

Specifically, in the present embodiment, the motion detection unit 62 detects an operator's motion of causing causes an operation tool or a finger of his/her own to approach the overlapping image, or an operator's motion of causing the pointer 106C, which is displayed on the display unit 106, to approach the overlapping image. At this point, a pen-type tool is given as one example of the operation tool.

The display control unit 63 as one example of a display control unit performs display control on the display unit 106.

Specifically, in a case where the gaze fixed on the overlapping image is detected and the specific motion is detected, the display control unit 63 changes a state where a plurality of images that are included in the overlapping image are arranged.

Furthermore, among the plurality of images that are displayed on the display control unit 63, the display unit 106 moves an image having a predetermined positional relationship with a specific position that is specified by the position specification unit 65 (which will be described below).

An operator's selection with respect to the image on the display unit 106 is received by the receiving unit 64 as one example of a receiving unit.

Specifically, the receiving unit 64 obtains positional information on an image that is displayed on the display unit 106, and an output (information indicating an operation position at which the operator performs an operation) from the operation receiving unit 107 (see FIGS. 1 and 2), and specifies content (an image that is selected by the operator) that is selected by the operator). The selected content (the image that is selected by the operator) is received by the receiving unit 64.

Based on the output from the gaze detection device 113, the position specification unit 65 as one example of a specification unit specifies a position on the display unit 106, which is a position of a destination toward which the operator's gaze is directed.

Figure 4:
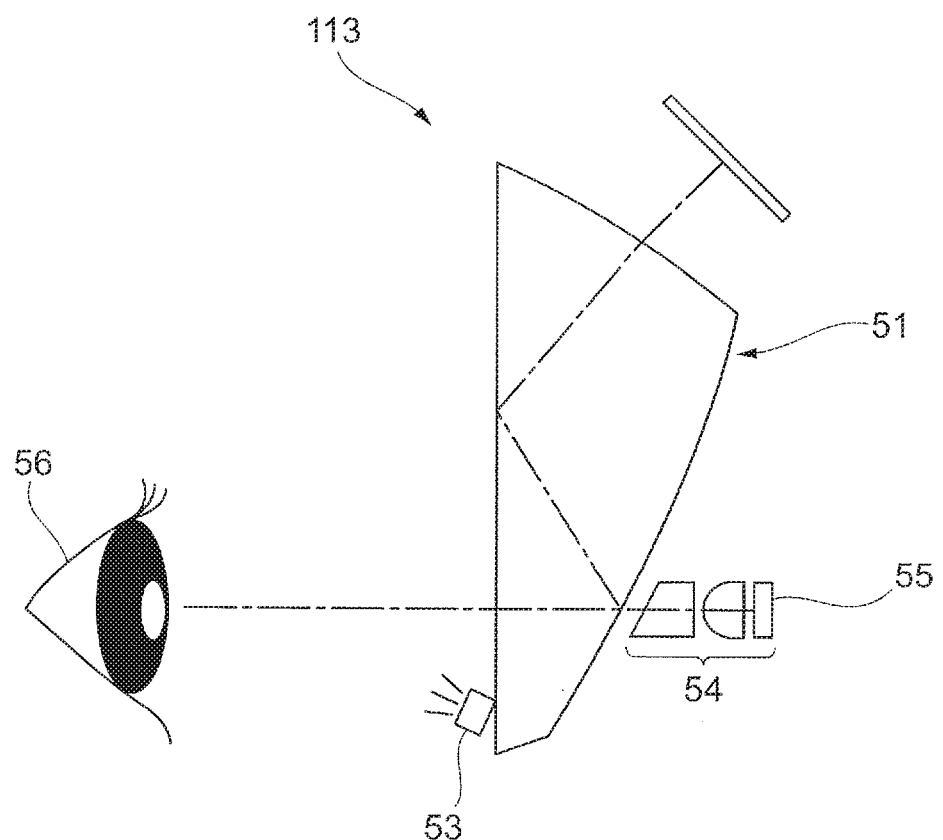
FIG. 4 is a diagram for describing a configuration of a gaze detection device.
Figure 5A:
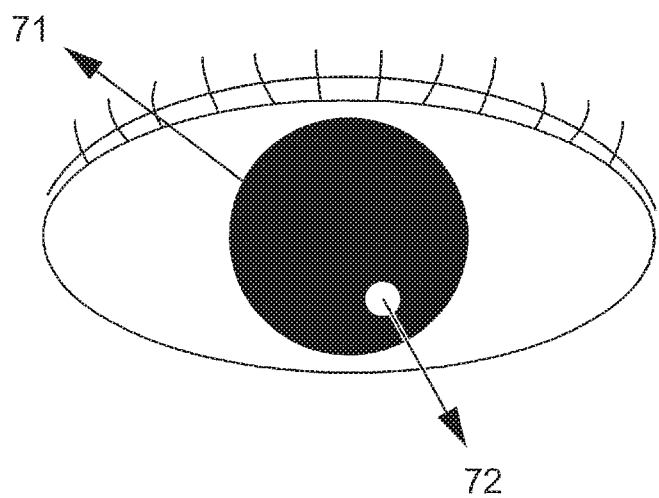
FIGS. 5A and 5B are diagrams describing the configuration of the gaze detection apparatus.
Figure 5B:
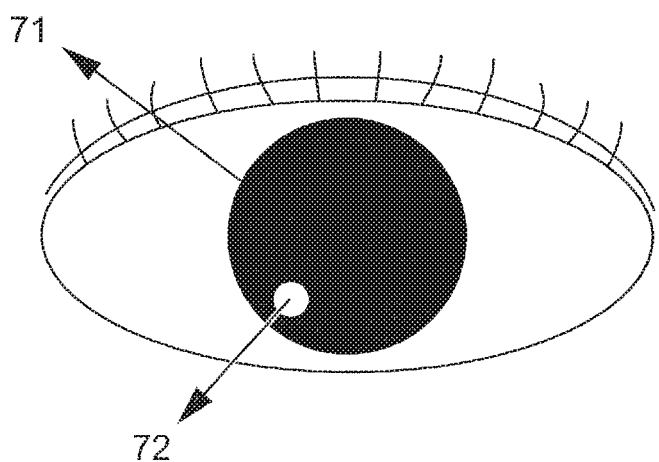

FIGS. 4, 5A and 5B are diagrams, each describing a configuration of the gaze detection device 113.

As described in FIG. 4, the gaze detection device 113 has a light source 53 that illuminates an eyeball 56 of the user with an infrared light in the form of a spot, and an infrared reflection light from the eyeball 56 passes through a minute aperture diaphragm that is provided on an eyepiece lens 51 and is incident on an optical lens group 54. The optical lens group 54 image-forms the incident infrared reflection light in the form of a dot on an image capture surface of the CCD 55, and the CCD 55 converts a virtual image (a Purkinje image) due to corneal reflection, which results from the image formation on the image capture surface, into an electrical signal, and outputs the electrical signal.

The virtual image, as illustrated in FIGS. 5A and 5B, is an image 72 due to the corneal reflection of the infrared light emitted from the light source 53 from a pupil 71, and a relative positional relationship between the center of the pupil 71 and the virtual image 72 changes in proportion to a rotation angle of an eyeball. In the present embodiment, image processing is performed using the electrical signal representing the virtual image from the CCD 55, and a direction of a user's gaze is detected based on a result of the image processing.

It is noted that the detection of the direction of the user's gaze may be performed any other known method, without being limited to methods that are illustrated in FIGS. 4, 5A, and 5B.

Figure 6A:
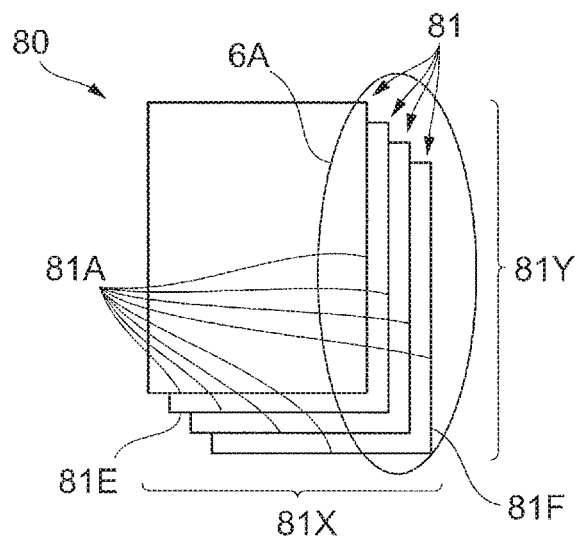
FIGS. 6A, 6B and 6C are diagrams describing display processing.
Figure 6B:
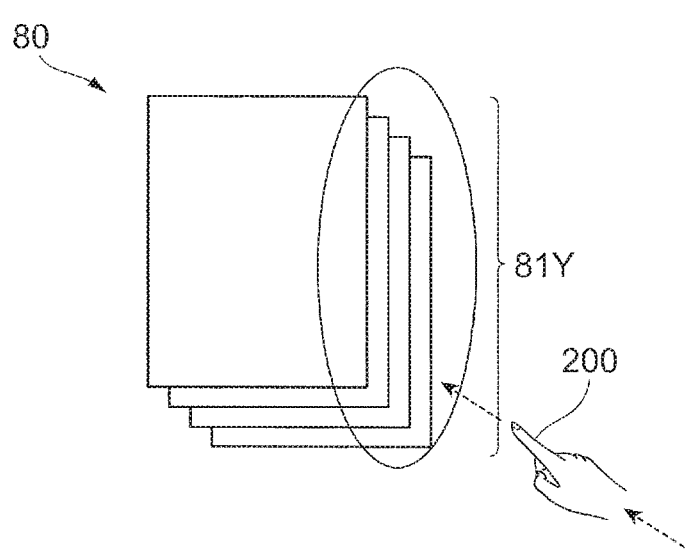
Figure 6C:
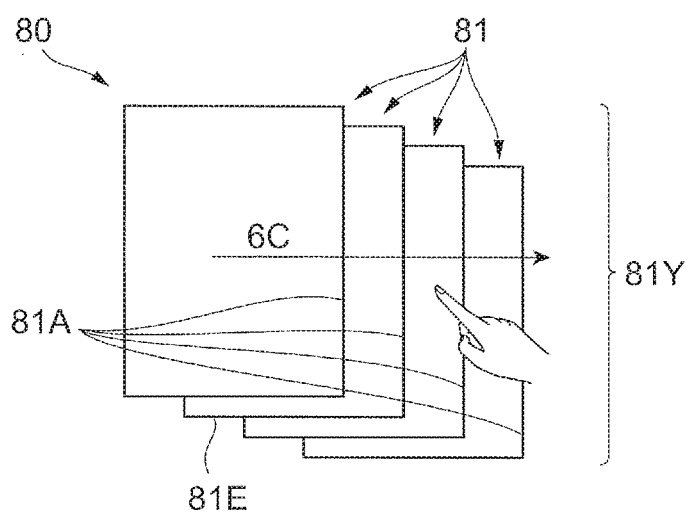

FIGS. 6A to 6C are diagrams, each for describing display processing according to the present embodiment.

In FIG. 6A, the overlapping image 80 is illustrated that is displayed on the display unit 106.

The overlapping image 80 is configured with a plurality of images 81 that are partially overlapped and are mutually deviated or shifted. Additionally, the overlapping image 80 is configured with the plurality of images 81 that correspond to a plurality of pages, respectively, which are mutually deviated.

Furthermore, in the overlapping image 80, the plurality of images 81 that correspond to a plurality of pages, respectively, are arranged in a state of being deviated in the direction of a diagonal of an image 81 that corresponds to any one page. Furthermore, in the overlapping image 80, the images 81, which constitute the overlapping image 80, are arranged side by side in a manner that is equally spaced.

Furthermore, in FIG. 6A, the operator's gaze is directed toward a specific portion (a portion that is indicated by a reference character 6A in FIG. 6A) of the overlapping image 80, and with the gaze detection unit 61, it is detected that the destination of the operator's gaze is in the specific portion.

Specifically, in the present embodiment, a portion (hereinafter referred to as an edge part and portion) where edge parts 81A that the images 81 have are arranged side by side, of the overlapping image 80, is registered in advance, as a specific portion, in the storage unit 105 of the image forming apparatus 10. In an example that is illustrated in FIG. 6A, with the gaze detection unit 61, it is detected that the destination of the operator's gaze is in the specific portion (the edge part and portion).

At this point, each image 81 that is included in the overlapping image 80 that is formed in the shape of a rectangle and that has sides. Specifically, each image 81 has a short side 81E and a long side 81F as sides.

For this reason, in the present embodiment, as the edge part and portion, there are present a first edge part and portion 81X in which the edge parts 81A are arranged side by side along the short side 81E in the upward-downward direction in FIG. 6A, and a second edge part and portion 81Y in which the edge parts 81A are arranged side by side the long side 81F in the leftward-rightward direction in FIG. 6A.

Then, in the present embodiment, the first edge part and portion 81X and the second edge part and portion 81Y, in which the edge parts 81A are arranged side by side, and the like are registered in advance, as the specific portion.

In an example that is illustrated in FIG. 6A, an edge part and portion that is positioned in the destination of the operator's gaze is the second edge part and portion 81Y, and in the present embodiment, with the gaze detection unit 61, it is detected that the destination of the operator's gaze is present in the second edge part and portion 81Y (the specific portion).

FIG. 6B illustrates a state next to the state that is illustrated in FIG. 6A.

In FIG. 6B, the overlapping image 80 and a finger 200 of the operator's own are illustrated that results when the operator causes the finger 200 of his/her own to approach the second edge part and portion 81Y.

In the present embodiment, in this manner, when the operator causes the finger 200 of his/her own to approach the second edge part and portion 81Y (the specific portion), this motion in which the finger 200 is caused to approach the second edge part and portion 81Y is detected by the motion detection unit 62.

Additionally, in the present embodiment, the operator's motion of causing the finger 200 of his/her own to approach the specific portion is registered in advance, as a specific motion, in the storage unit 105 of the image forming apparatus 10. In the present embodiment, when the operator makes this specific motion, the specific motion is detected by the motion detection unit 62.

More specifically, the motion detection unit 62 interprets an output from the camera 112, and, based on the output from the camera 112 and on positional information (information indicating a position of the overlapping image 80 on the display unit 106) on the overlapping image 80, the operator interprets whether or not the finger 200 is caused to approach the second edge part and portion 81Y of the overlapping image 80.

Then, in a case where the finger 200 approaches the second edge part and portion 81Y of the overlapping image 80, the motion detection unit 62 detects that the operator makes a predetermined specific motion.

Then, in the present embodiment, in this manner, in a case where the operator's gaze fixed on the specific portion (the second edge part and portion 81Y) of the overlapping image 80 is detected and where it is detected that the operator makes the predetermined specific motion (the motion of causing the finger 200 to approach the second edge part and portion 81Y), the display control unit 63, as illustrated in FIG. 6C, changes an arrangement of the plurality of images 81 that are included in the overlapping image 80.

Specifically, the display control unit 63 changes the arrangement of the plurality of images 81 in such a manner that a deviation between the images 81, among the plurality of images 81 that are included in the overlapping image 80, increases.

More specifically, the display control unit 63 moves each of the plurality of images 81 in such a manner that a gap between the edge parts 81A adjacent to each other, which are positioned in the second edge part and portion 81Y.

Additionally, in an example of the present embodiment, the display control unit 63 moves each image 81 that is included in the overlapping image 80, along a direction in which the short side 81E, which each image 81 has, extends.

Furthermore, the display control unit 63 moves each image 81 in one direction, as indicated by an arrow 6C in FIG. 6C, in moving each of the images 81. Furthermore, each image 81 is moved in such a manner that an amount of movement increases as much as necessary to reach the image 81 that is positioned downstream in a direction of movement.

In this manner, in a case where the image 81 is moved that is included in the overlapping image 80, it is difficult for an error in an operation to occur when the operator selects the image 81. More specifically, it is difficult for the error in an operation to occur when one or several images 81 are selected from among the plurality of images 81 that are included in the overlapping image 80.

Additionally, as in the present embodiment, when a deviation between the images 81 is increases, it is difficult for an error in selection to occur when one or several images 81 is selected from among the plurality of images 81, compared with a case where the deviation between the images 81 is not increased.

It is noted that, in the present embodiment, when a state is reached that is illustrated in FIG. 6B, the arrangement of the images 81 starts to be changed.

In other words, before the finger 200 of the operator reaches the overlapping image 80, the display control unit 63 changes the arrangement of the plurality of images 81. Additionally, while the finger 200 of the operator is in the middle of getting closer to the overlapping image 80, the display control unit 63 moves the image 81 and increases the deviation between the images 81.

In this case, the operator makes a selection of the image 81 at an earlier timing than in a case where the arrangement is changed after the finger 200 of the operator reaches the overlapping image 80.

It is noted that the processing in the case where the finger 200 is caused to approach is described above, but that, in a case where the selection of the image 81 is made with the operation tool or the pointer 106C (see FIG. 2), when the operation tool or the pointer 106C approaches the second edge part and portion 81Y, in the same manner, the gap between the edge parts 81A that are positioned in the second edge part and portion 81Y and are adjacent to each other is also broadened.

Figure 7A:
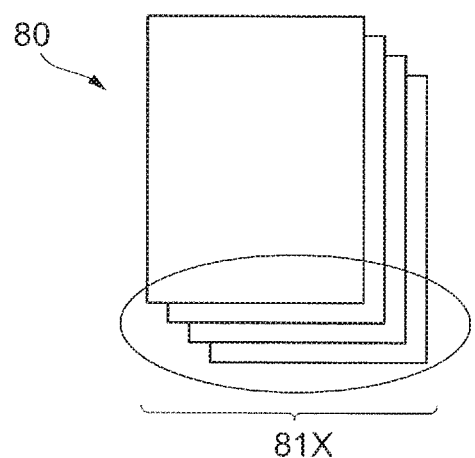
FIGS. 7A, 7B and 7C are diagrams illustrating other display processing.
Figure 7B:
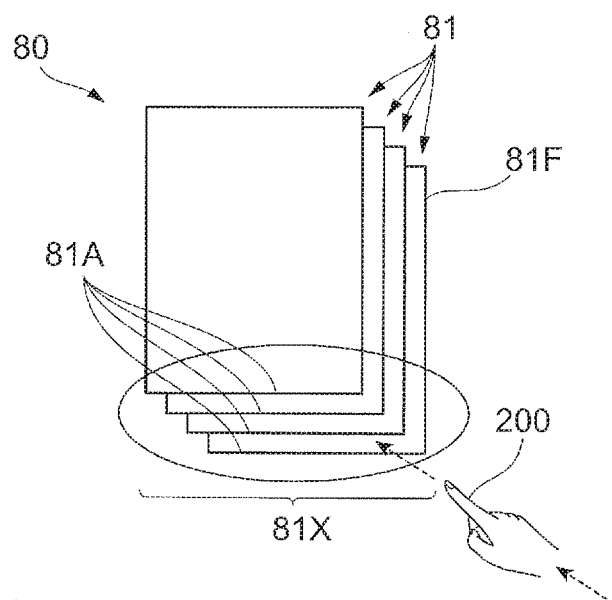
Figure 7C:
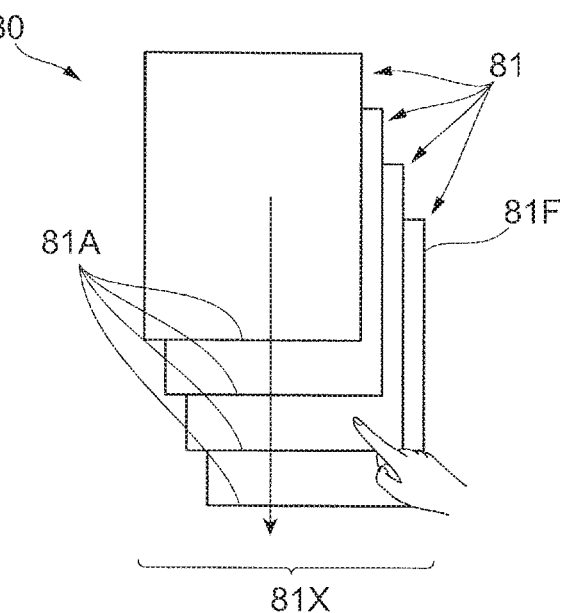

FIGS. 7A to 7C are diagrams, each illustrating any other display processing.

In the processing that is illustrated in each of FIGS. 6A to 6C, which is described above, the case where the destination of the operator's gaze is present in the second edge part and portion 81Y and where the finger 200 of the operator approaches the second edge part and portion 81Y is described.

In contrast, in processing that is illustrated in each of FIGS. 7A to 7C, a case where the destination of the operator's gaze is present in the first edge part and portion 81X and where the finger 200 of the operator is caused to approach the first edge part and portion 81X.

In the case where the finger 200 of the operator approaches the first edge part and portion 81X, as illustrated in FIGS. 7B and 7C, each image 81 that is included in the overlapping image 80 moves along a direction in which the long side 81F, which each image 81 has, extends.

In other words, each image 81 moves along the downward-upward direction in FIGS. 7A to 7C in such a manner that the gap between the edge parts 81A that are positioned in the first edge part and portion 81X is broadened. Furthermore, each image 81 moves in such a manner that the amount of movement increases as much as necessary to reach the image 81 that is positioned downstream in the direction of movement.

In this case, in the same manner as described above, it is also difficult for the error in selection to occur when one or several images 81 are selected from among the plurality of images 81.

In the present embodiment, as illustrated in FIGS. 6C and 7C, when each image 81 is moved that is included in the overlapping image 80, each image 81 is moved along a direction in which a side, which each image has, extends.

Specifically, in an example that is illustrated in FIG. 6C, each image 81 is moved along a direction in which the short side 81E extends. Furthermore, in an example that is illustrated in FIG. 7C, each image 81 is moved along a direction in which the long side 81F extends.

At this point, the direction of movement when each image 81 is moved is not limited to a direction along the side, and may be a direction that intersects the direction along the side.

Figure 8A:
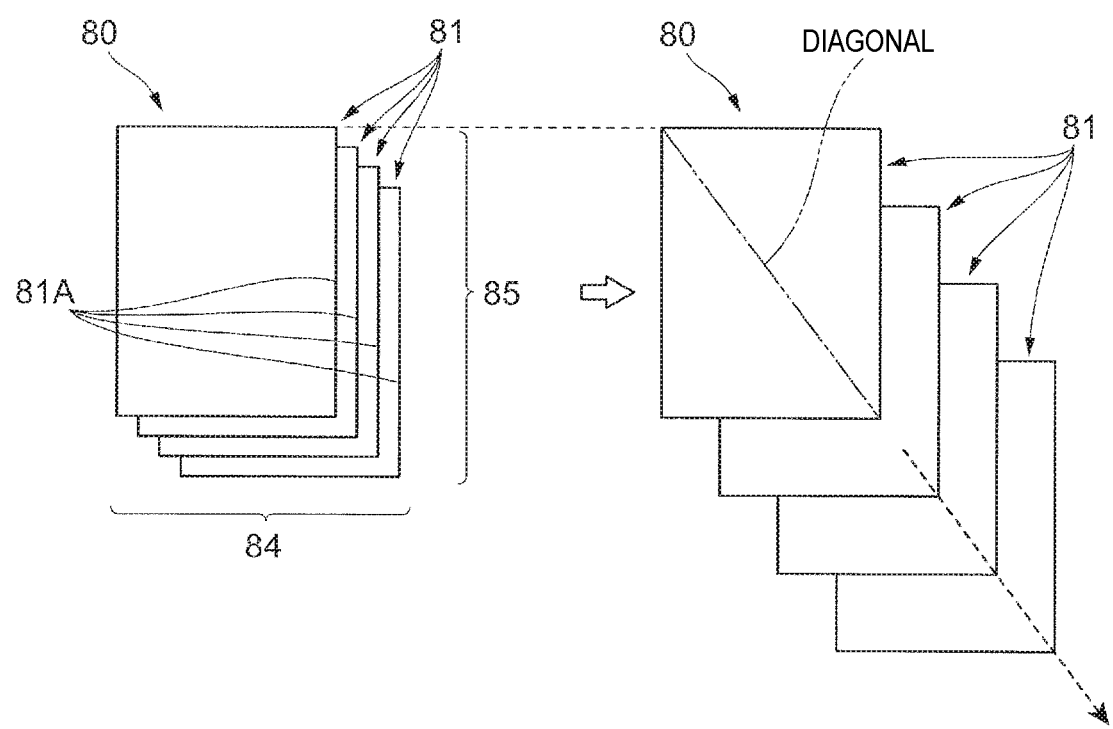
FIGS. 8A and 8B are diagrams illustrating other display processing on a display unit.

Specifically, for example, in a case where the destination of the operator's gaze is present in the overlapping image 80 and where the finger 200 of the operator approaches the overlapping image 80, as illustrated in FIG. 8A (a diagram that illustrates any other display processing on the display unit 106, each image 81 may be moved in a direction in which a diagonal of the image 81, which is included in the overlapping image 80, extends.

In this case, on both the short side 84 side and the long side 85 side of the overlapping image 80, the deviation between the images 81 increases (the gap between the edge parts 81A is broadened), and on both the short side 84 side and the long side 85 side, the selection of the image 81 is easy to make.

It is noted that, in a case where each image 81 is moved in the diagonal direction, an area that is occupied by the overlapping image 80 after the image 81 is moved increases much more than in a case where each image 81 is moved along the side.

For this reason, for example, in a case where a space for moving the image 81 is small, such as in a case where an area of the display unit 106 is small, and so forth, as illustrated in FIGS. 6A, 6B, 6C, 7A, 7B, and 7C, it is preferable that each image 81 is moved in a direction in which the side extends.

Furthermore, in moving each image 81 that is included in the overlapping image 80, instead of moving the image 81 only in one direction, one or several images 81 may be moved in one direction and any other image 81 may be moved in the direction opposite to the one direction.

Figure 8B:
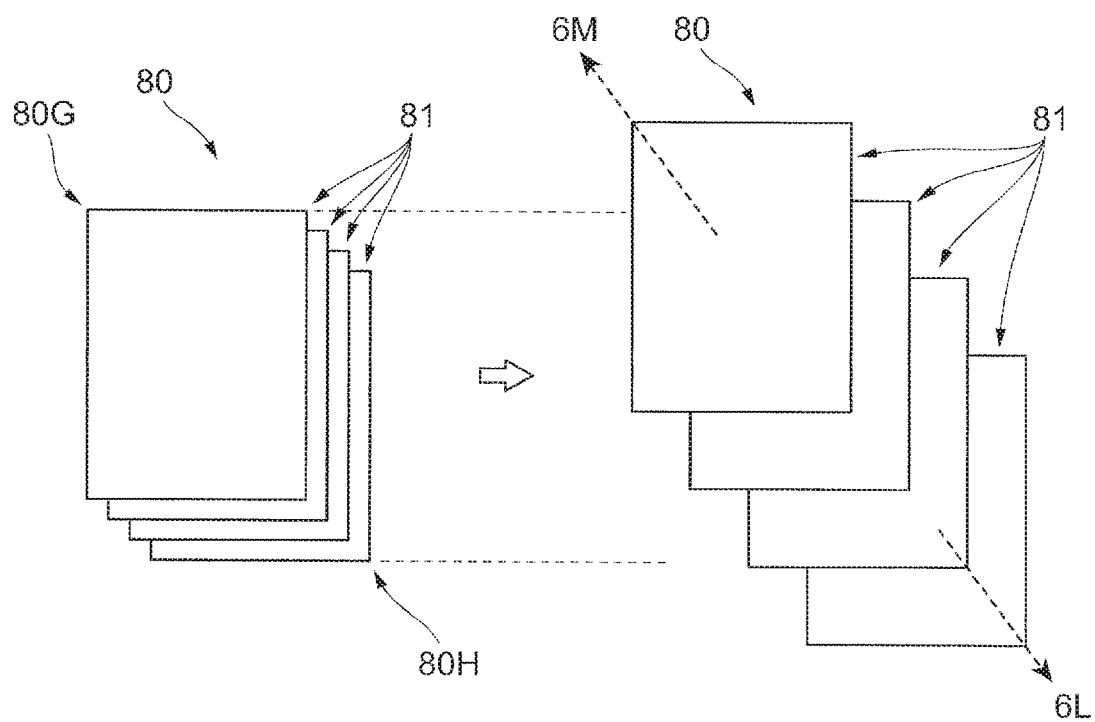

Specifically, for example, as illustrated in FIG. 8B, among the plurality of images 81 that are included in the overlapping image 80, an image 81 that is positioned close to a corner portion 80H in the lower right portion of FIG. 8B may be moved in one direction that is indicated by an arrow 6L in FIG. 8B, and an image 81 that is positioned close to a corner portion 80G in the upper left portion of FIG. 8B may be moved in the opposite direction that is indicated by an arrow 6M in FIG. 8B.

In other words, in this example, among the images 81 that are included in the overlapping image 80, an image 81 that is positioned close to one end portion (an end portion (a corner portion) in the lower right side of FIG. 8B) of the overlapping image 80 is moved in one direction that is indicated by the arrow 6L in FIG. 8B, and an image 81 that is positioned close to the opposite end portion (an end portion (a corner portion) in the upper left side of FIG. 8B) of the overlapping image 80 is moved in the opposite direction that is indicated by the arrow 6M in FIG. 8B.

It is noted that, in this movement, in the same manner as described above, an amount of movement is increased as much as necessary to reach the image 81 that is positioned downstream in the direction of movement.

At this point, when a configuration is employed in which the image 81 is moved only in one direction, and when any other image or the like is present downstream in the one direction, the amount of the movement of the image 81 is small and the amount of the movement of the image 81 is difficult to secure.

As described above, if the image 81 is made to be moved not only in one direction, but also the opposite direction, the amount of the movement of the image 81 is easier to secure than in the case where the image 81 is moved only in one direction.

It is noted that, in an example that is illustrated in FIG. 8B, the case where the image 81 is moved in the direction of the diagonal of the image 81 in moving the image 81 in one direction and the opposite direction is described, but that, in the same as in the processing that are illustrated in FIGS. 6A, 6B, 6C, 7A, 7B, and 7C, the moving image 81 may be moved along the side of the image 81 that is included in the overlapping image 80, without the direction of the movement of the image 81 being limited to this.

At this point, in a case where the image 81 is moved along the side of the image 81 that is included in the overlapping image 80, one or several images 81 that are included in the overlapping image 80, for example, is moved in the rightward direction, and any one or several images 81 are moved in the leftward direction.

Furthermore, in addition to this, in the case where the image 81 is moved along the side of the image 81 that is included in the overlapping image 80, one or several images 81 that are included in the overlapping image 80, for example, is moved in the upward direction, and any one or several images 81 are in the downward direction.

Furthermore, in moving the image 81 that is included in the overlapping image 80, the image 81 may be made to be moved toward a broader gag, among a plurality of gaps that are positioned adjacent to the overlapping image 80.

Figure 9:
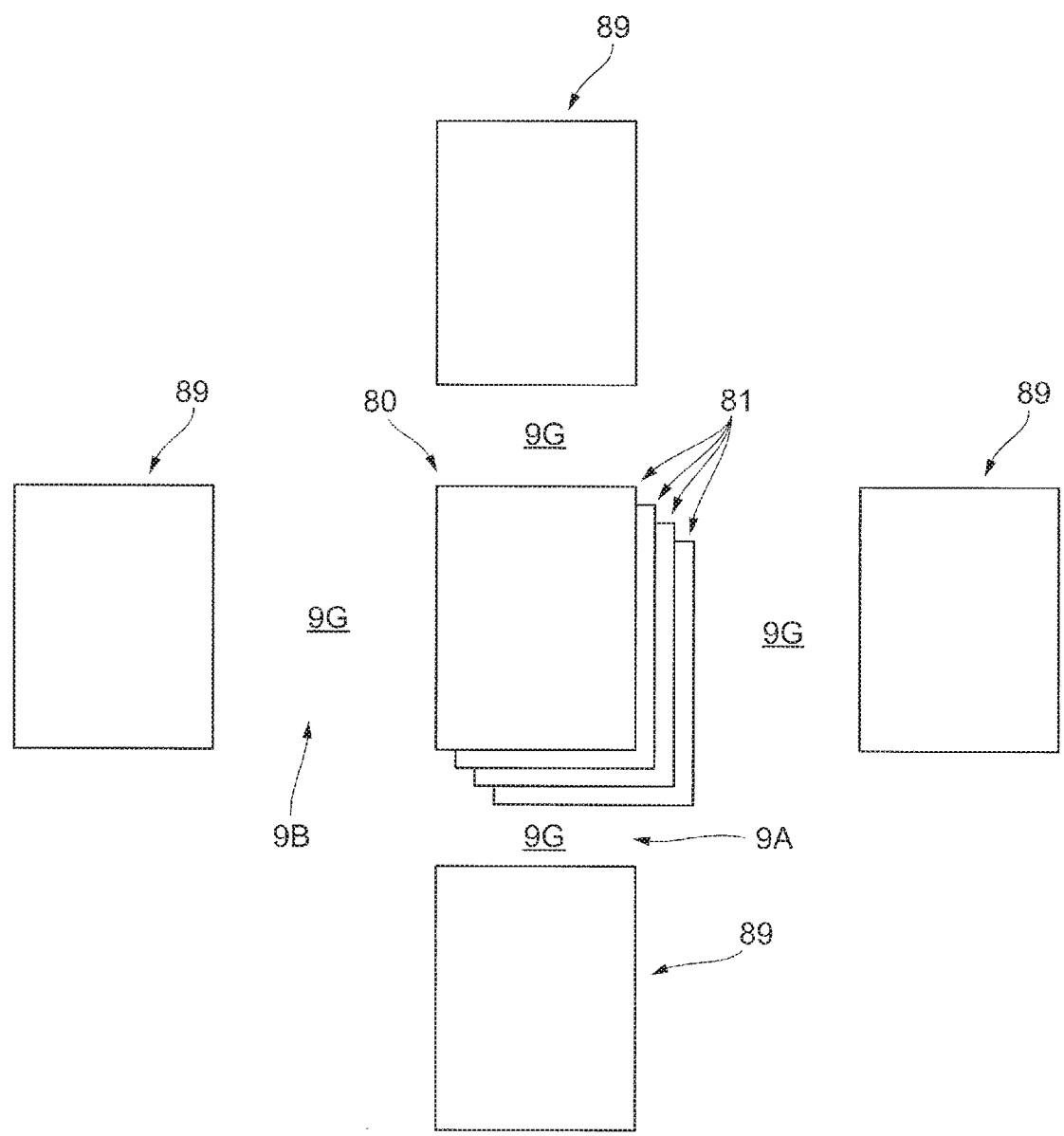
FIG. 9 is a diagram illustrating a display example on the display unit.

In many cases, as illustrated in FIG. 9 (a diagram illustrating an example of display on the display unit 106), in addition to one overlapping image 80, any other images 89 are displayed on the display unit 106.

More specifically, for example, in some cases, any other images 89, which are arranged to be spaced with a gap 9G over or under the overlapping image 80, to the left or right side of the overlapping image 80, and in any other position adjacent to the overlapping image 80, may be displayed.

In this case, in moving the image 81 that is included in the overlapping image 80, it is preferable that, among gaps 9G each of which is positioned between the overlapping image 80 and any other image 89, the image 81 is moved toward a gap 9G other than the smallest gap 9G.

In an example that is illustrated in FIG. 9, the gap 9G that is indicated by a referee character 9A is the smallest gap 9G and in such a case, it is preferable that the image 81 is moved toward a gap 9G other than the smallest gap 9G.

More preferably, among a plurality of gaps 9G the image 81 is moved toward the greatest gap 9G.

In this example, the gap 9G that is indicated by a reference character 9B is the greatest gap 9G, and it is preferable that the image 81 is moved toward the greatest gap 9G.

In a case where the image 81 is moved toward a small gap 9G, the amount of the movement of the image 81 is difficult to secure. In contrast, in a case where the image 81 is moved toward a great gap 9G, the amount of the movement of the image 81 is easy to secure.

Figure 10:
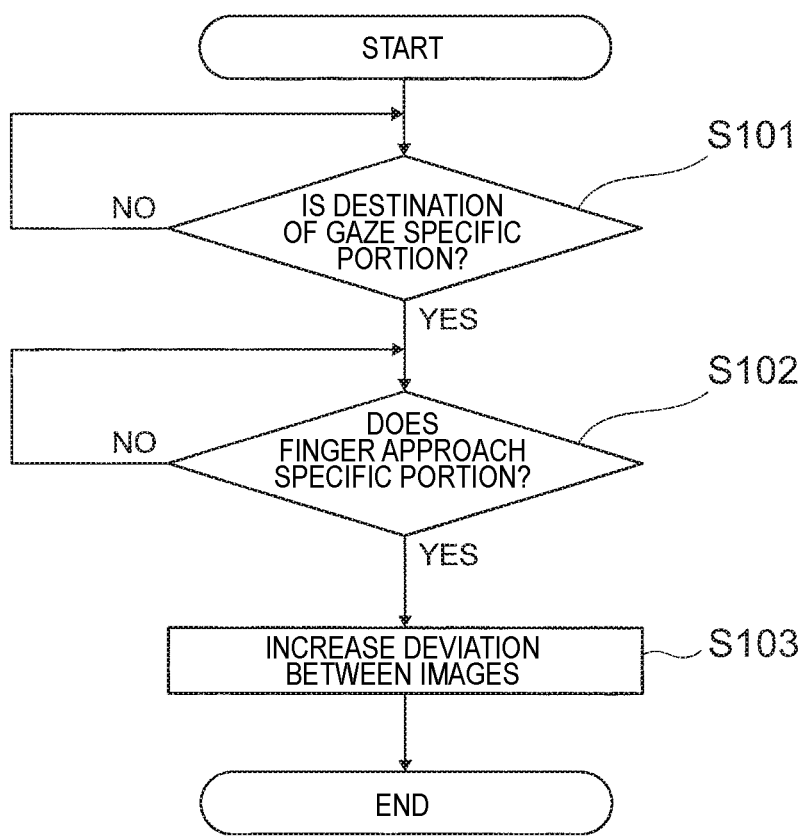
FIG. 10 is a flowchart illustrating a flow for processing that is described with reference to FIGS. 6A to 9.

FIG. 10 is a flowchart illustrating a flow for the processing that is described with reference to FIGS. 6 to 9.

In the present embodiment, first, the gaze detection unit 61 determines whether or not the destination of the operator's gaze is present in the above-described specific portion of the overlapping image 80 (Step 101).

Then, in a case where it is determined that the destination of the operator's gaze is present in the specific portion, the motion detection unit 62 determines whether or not the finger 200 approaches the specific place (Step 102).

Then, in a case where the finger 200 approaches the specific portion, the display control unit 63 changes the arrangement of the images 81 that are included in the overlapping image 80 and increases the deviation between the images 81 (Step 103).

It is noted that, in the present embodiment, the case where the destination of the operator's gaze is present in the specific portion of the overlapping image 80 and where the finger 200 of the operator gets closer to the specific place of the overlapping image 80, the arrangement of the images 81 is changed.

Incidentally, in a case where the destination of the operator's gaze is present in any portion of the overlapping image 80 and where the finger 200 of the operator approaches any portion of the overlapping image 80, the change of the arrangement may be performed. In other words, in a case where, without any limitation to a specific place, the gaze is directed toward any portion of the overlapping image 80 and the finger 200 of the overlapping image 80 gets closer to any portion of the overlapping image 80, the arrangement may be changed.

Furthermore, the change of the arrangement may be performed after the finger 200 of the operator reaches the overlapping image 80 (the change of the arrangement may be performed after the finger 200 of the operator reaches the overlapping image 80 and comes into contact with the operation receiving unit 107).

FIGS. 11A, 11B, 12A, and 12B are diagrams, each illustrating other display processing on the display unit 106.

Figure 11A:
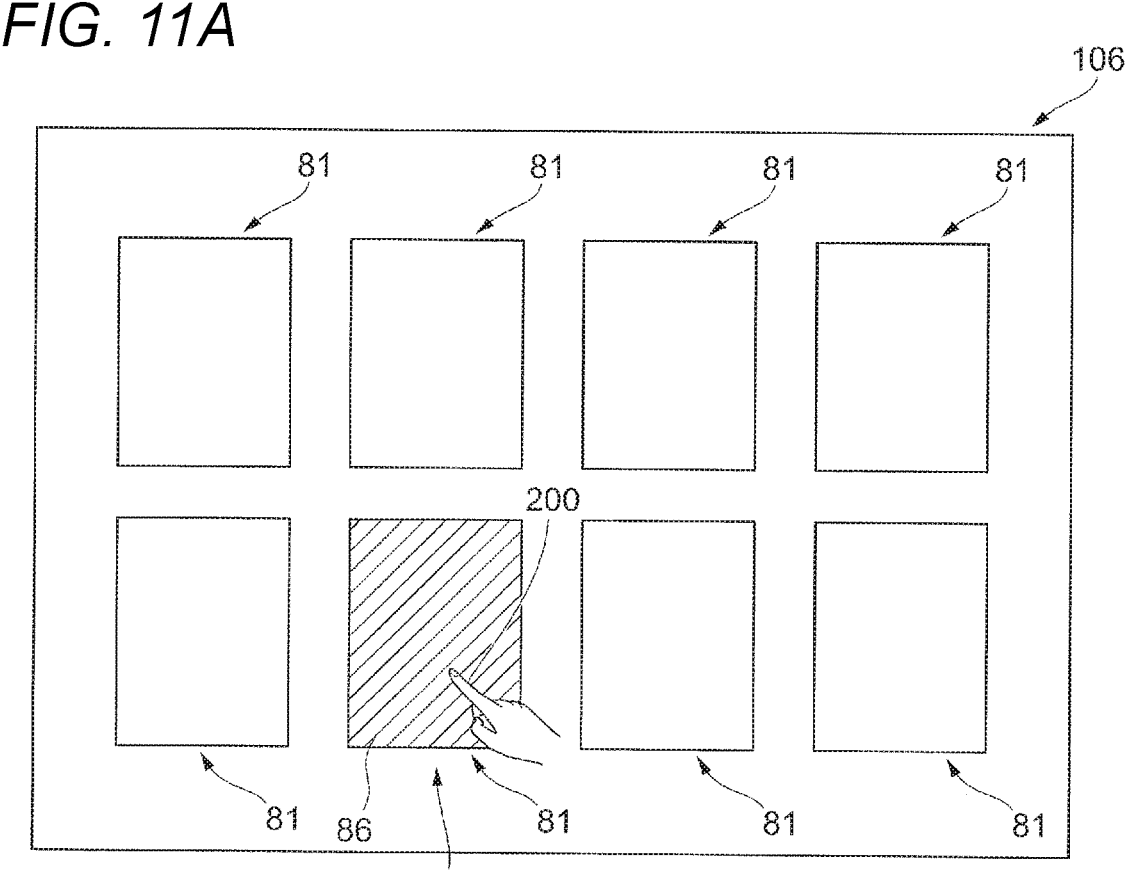
FIGS. 11A and 11B are diagrams illustrating other display processing on the display unit.

In this processing example, as illustrated in FIG. 11A, a plurality of images 81 are displayed side by side on the display unit 106. In other words, the plurality of images 81 are arranged in a lattice form. Additionally, a plurality of images 81 are arranged side by side along each of the row direction and the column directions.

Then, in this processing, as indicated by a reference character 11A in FIG. 11A, with the finger 200 of the operator, one or several images 81 are selected from among the plurality of images 81 and the operator's selection with respect to the image 81 on the display unit 106 is received by the receiving unit 64 (see FIG. 3).

More specifically, the receiving unit 64 obtains positional information on each of the images 81 that are displayed on the display unit 106, and an output (the output of an operation position at which the operation performs an operation) from the operation receiving unit 107, and receives the image 81 (hereinafter referred to as a "selection image 86"). In other words, the receiving unit 64 receives content that is selected by the operator.

Next, in the present embodiment, the position specification unit 65 specifies a position on the display unit 106, which is a position of a destination toward which the gaze of the operator who makes a selection of the image 81 is directed.

Specifically, based on the output from the gaze detection device 113 (see FIG. 1), the position specification unit 65 specifies a position on the display unit 106, which is a position of a destination toward which the operator's gaze is directed.

Figure 11B:
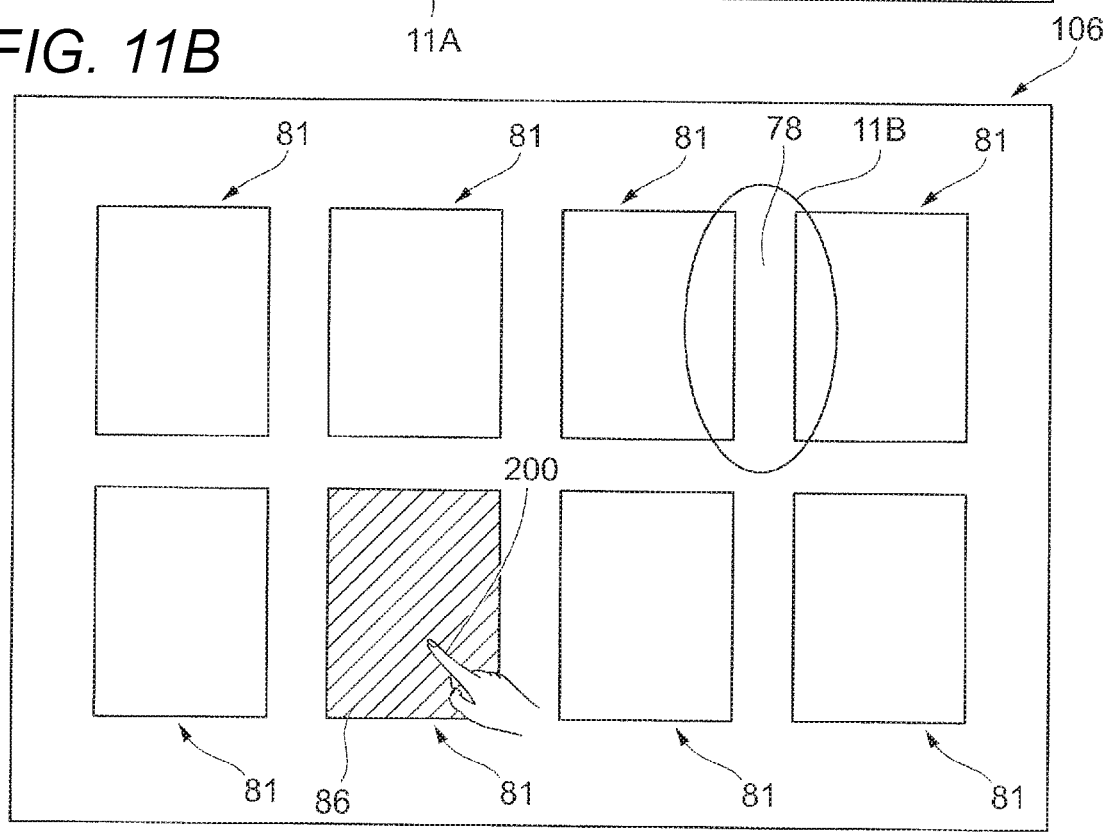

In this example, a portion that is indicated by a reference character 11B in FIG. 11B is a position (hereinafter referred to as a specific position 78) that is specified by the position specification unit 65. In other words, the portion that is indicated by a reference character 11B is a portion that is positioned in the destination of the operator's gaze.

At this point, in an example that is illustrated in FIG. 11B, the specific position 78 is present between two images 81 that are adjacent to each other.

Figure 12A:
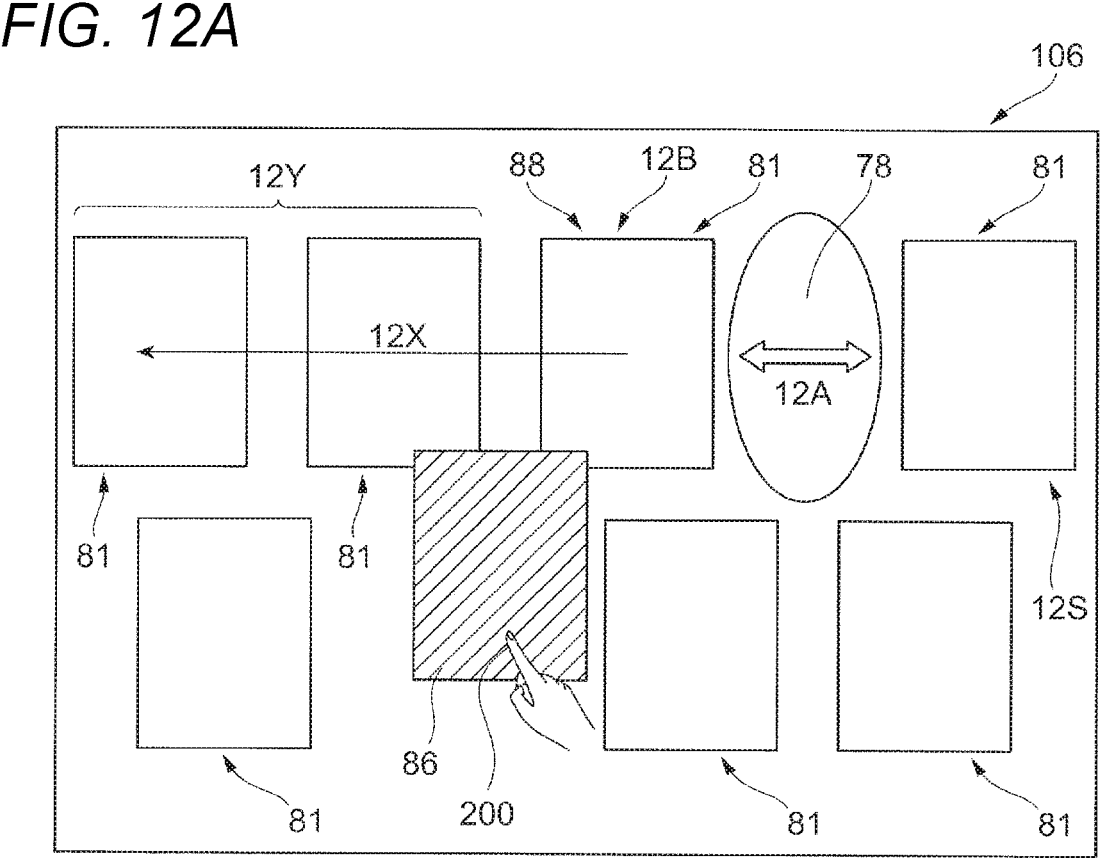
FIGS. 12A and 12B are diagrams illustrating other display processing on the display unit.

Thereafter, in this display example, as illustrated in FIG. 12A, the operator moves the finger 200 that is in a state where the selection image 86 is selected, in such a manner as to face the specific position 78.

Thereafter, as illustrated in an arrow 12A in FIG. 12A, the display control unit 63 broadens a gap between two images 81 that are adjacent to each other, with the specific position 78 in between.

In other words, the display control unit 63 moves the image 81 that is positioned adjacent to the specific position 78, in a direction away from the specific position 78, and broadens the gap between the two images 81 that is adjacent to each other.

It is noted that, in this display example, the case is described where the gap between two images 81 is broadened in a case where the operator moves the finger 200 in the state where the selection image 86 is selected, in such a manner as to face the specific position 78, but that the gap between two images 81 may also be broadened in a case where the finger 200 is not moved in such a manner as to face the specific position 78.

Specifically, for example, if a position (the specific position 78) of the destination of the operator's gaze is present in the gap between two images 81, although the finger 200 is not moved, the gap between two images 81 may be broadened.

In the present embodiment, among a plurality of images 81 on the display unit 106, the display control unit 63 moves an image 81 (an image 81 that is positioned adjacent to the specific position 78) that has a predetermined positional relationship with the specific position 78 which is specified by the position specification unit 65, and thus broadens the gap between two images 81 that are adjacent to each other.

More specifically, the display control unit 63 moves both the two images 81 with the specific position 78 in between, in the direction away from the specific position 78, and thus broadens the gap. It is noted that in this processing example, in this manner, both the two images 81 are moved, but that only one image may be moved.

Furthermore, in the present embodiment, instead of only an image 81 (hereinafter referred to as an "adjacent image 88") being moved in the direction away from the specific position 78, an image 81 that is positioned more downstream than the adjacent image 88 is also moved in the direction away from the specific position 78.

Specifically, in the present embodiment, an image 81 that is indicated by a reference character 12B in FIG. 12A is the adjacent image 88, and the adjacent image 88 moves in a direction that is indicated by an arrow 12X, which is the direction away from the specific position 78.

In the present embodiment, at this time, regarding the direction away from the specific position 78, an image 81 (an image 81 that is indicated by a reference character 12Y) (all images 81 that are positioned more downstream than the adjacent image 81) that is positioned more downstream than the adjacent image 88 is also moved in the direction away from the specific position 78.

Accordingly, an amount of movement of the adjacent image 88 is easier to secure than in a case where the image 81 that is positioned downstream than the adjacent image 88 is not moved.

Figure 12B:
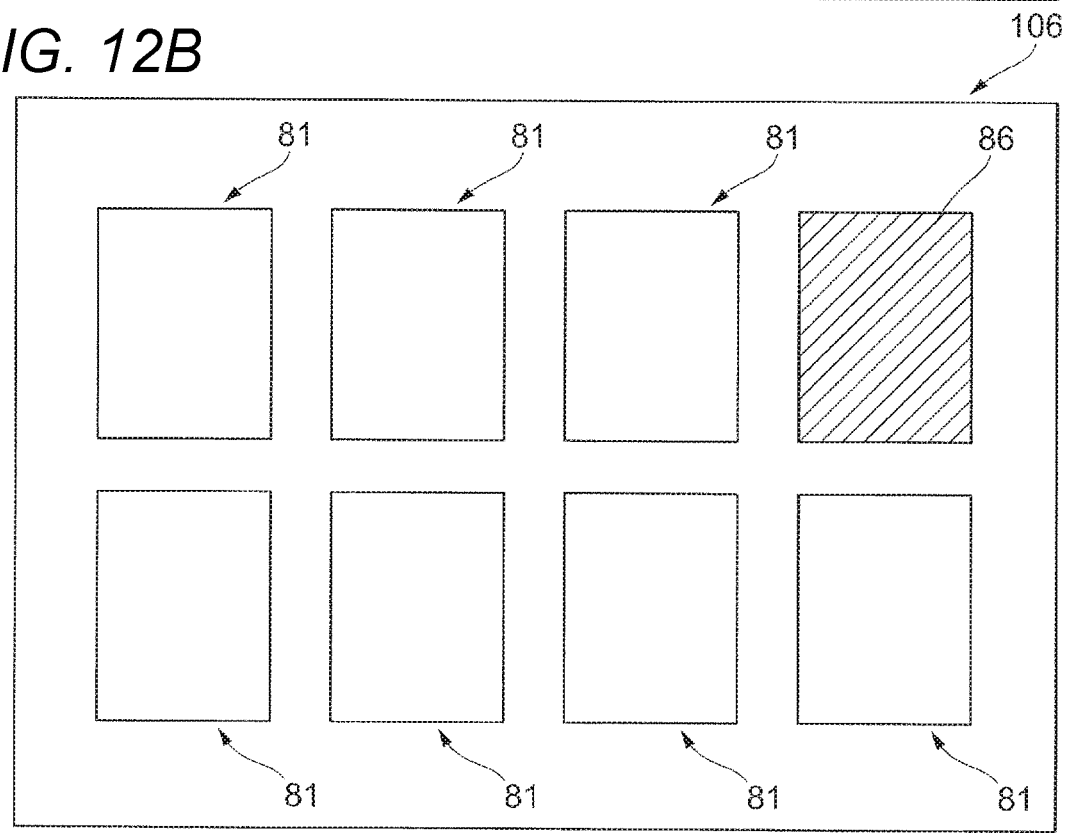

Thereafter, in the present embodiment, an operation (movement of the selection image 86 by the operator) by the operator is further performed, and, as illustrated in FIG. 12B, the selection image 86 is positioned in a position in which the broadened gap is positioned. It is noted that, in this example, because only four images 81 is displayed in one row, one image 81 (an image 81 that is indicated by a reference character 12S in FIG. 12A) that is positioned to the right, of the above-described two images 81 is moved to the next line (a lower line).

In the present embodiment, when the operator moves the selection image 86, a space (a gap) that is a destination to which the selection image 86 is moved is broadened, the selection image 86 is easy to move, and it is difficult for an error in an operation to occur when moving the selection image 86.

Figure 13A:
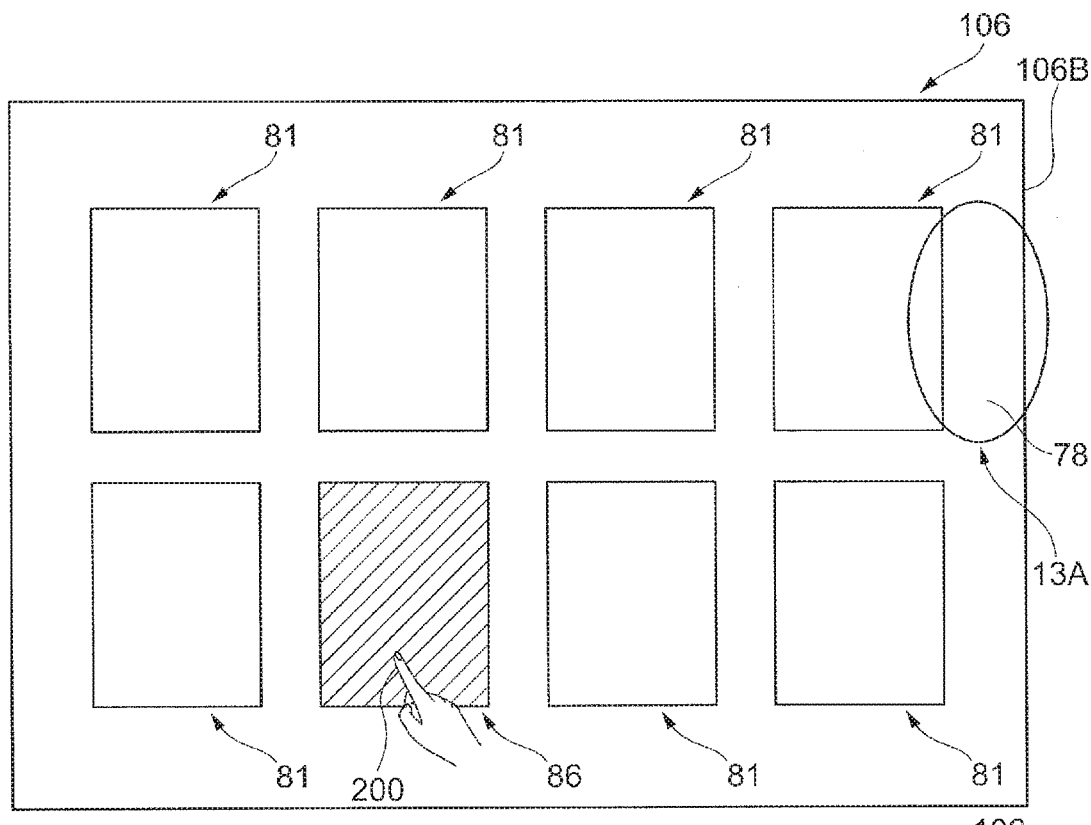
FIGS. 13A and 13B are diagrams illustrating other processing on the display unit.
Figure 13B:
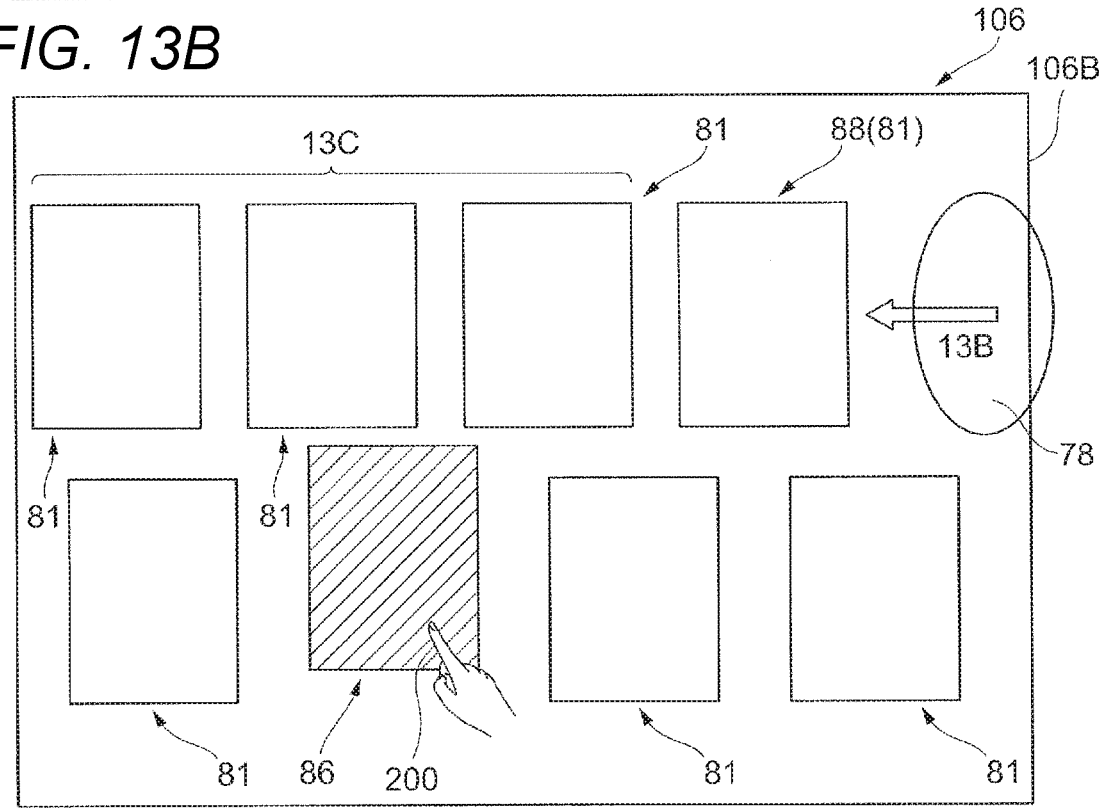

FIGS. 13A and 13B are diagrams, each illustrating any other display processing on the display unit 106.

In this processing example, as indicated by a reference character 13A in FIG. 13A, the specific position 78 that is specified by the position specification unit 65 is present between an image 81 that is displayed on the display unit 106, and the rim 106B of the display unit 106.

In other words, in this processing example, it is considered that the operator moves the selection image 86 in such a manner as to be positioned between the rim 106B of the display unit 106 and the image 81 that is displayed on the display unit 106.

In this case, as indicated by an arrow 13B in FIG. 13B, the adjacent image 88 that is positioned adjacent to the specific position 78 is moved in the direction away from the specific position 78. Accordingly, in the same manner as described above, a gap between the adjacent image 88, which is moved, and the rim 106B is broadened, the selection image 86 is easy to move to the gap.

It is noted that in this processing example, in the same manner as described above, an image 81 (an image that is indicated by a reference character 13C) that is positioned more downstream than the adjacent image 88 is moved in the direction away from the specific position 78.

Figure 14:
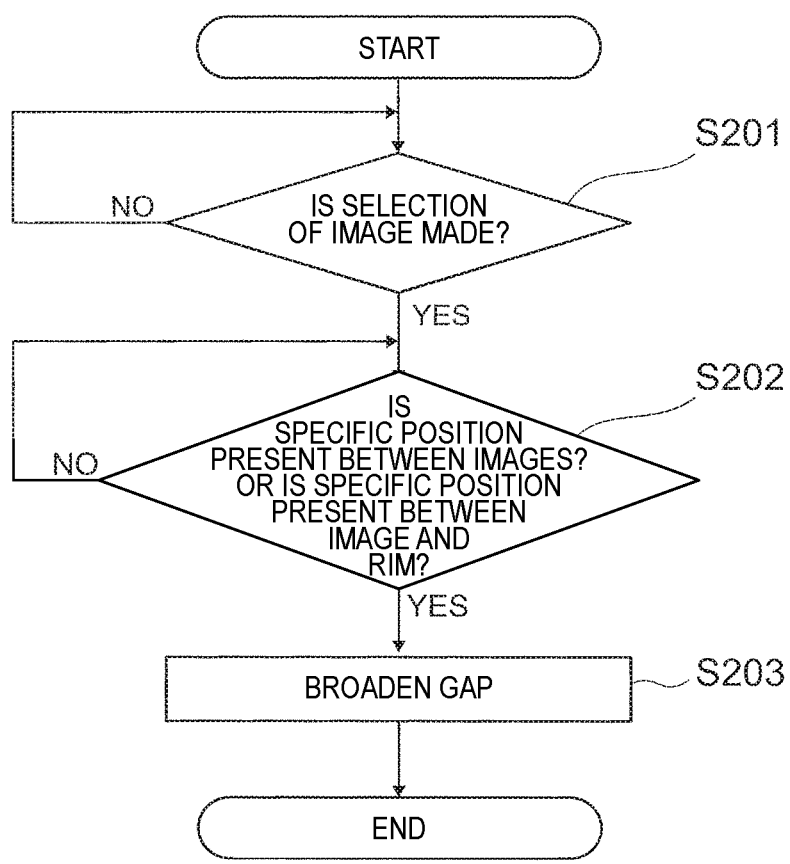
FIG. 14 is a flowchart illustrating a flow for processing that is illustrated in FIGS. 11A to 13B.

FIG. 14 is a flowchart illustrating a flow for the processing that is described with reference to FIGS. 11A to 13B.

In this processing that is illustrated in FIG. 14, first, the receiving unit 64 determines whether or not a selection of an image 81 is made by the operator (Step 201). Then, in a case where the selection of the image 81 is made by the operator, the position specification unit 65 knows the specific position 78 that is a position on the display unit 106, which is the position of the destination toward which the operator's gaze is directed.

Subsequently, the position specification unit 65 determines whether the specific position 78 is present between two images 81 or between an image 81 and the rim 106B (Step 202).

Then, in a case where the specific position 78 is present between two images 81 or between an image 81 and the rim 106B, the display control unit 63 moves the adjacent image 88 that is positioned adjacent to the specific position 78, and thus broadens a gap that is the destination to which the selection image 86 is moved (Step 203).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
   a display configured to display an overlapping image including images which are overlapped and are mutually deviated; and
   at least one processor configured to execute:
     a gaze detection unit that detects a gaze of an operator;
     a motion detection unit that detects a motion that is made if the operator performs an operation on the overlapping image; and
     a display control unit that increases a deviation between images among the images in response to both the gaze detection unit detecting that the gaze is directed to the overlapping image and the motion detection unit detecting the motion.

2. The information processing apparatus according to claim 1, wherein each of the images is rectangular and has sides, and
   wherein the display control unit increases the deviation between the images by moving an image included in the images along a direction in which at least one of the sides extends.

3. The information processing apparatus according to claim 1, wherein each of the images is rectangular, and
   wherein the display control unit increases the deviation between the images by moving an image included in the images along a direction of a diagonal of the image.

4. The information processing apparatus according to claim 1, wherein the display control unit increases the deviation between the images by moving the images and, in moving the images, moves one or several images in one direction and moves any other image included in the images in a direction opposite to the one direction.

5. The information processing apparatus according to claim 1, wherein the display is configured to display other images around the overlapping image with gaps between the other images and the overlapping image, and
   wherein the display control unit increases the deviation between the images by moving the images and, in moving the images, moves one of the images toward a gap other than a smallest gap among the gaps.

6. The information processing apparatus according to claim 5, wherein the display control unit moves the one of the images toward a greatest gap among the gaps.

7. The information processing apparatus according to claim 1, wherein the gaze detection unit detects that the gaze of the operator is directed to a portion of the overlapping image, and
   wherein the display control unit changes the arrangement of the images if the gaze detection unit detects that the gaze is directed to the portion of the overlapping image and the motion detection unit detects the motion.

8. The information processing apparatus according to claim 7, wherein the gaze detection unit detects that the gaze of the operator is directed to a place where edge parts of each of the images are arranged side by side, and
   wherein the display control unit changes the arrangement of the images in response to both the gaze detection unit detecting that the gaze is directed to the place and the motion detection unit detecting the motion.

9. The information processing apparatus according to claim 8, wherein the display control unit changes the arrangement of the images such that a gap is broadened between ones of the edge parts which are adjacent to each other.

10. The information processing apparatus according to claim 1, wherein the motion detection unit detects a motion of the operator causing an operation tool or a finger of the operator to approach the overlapping image or a motion of causing a pointer, which is displayed on the display, to approach the overlapping image.

11. The information processing apparatus according to claim 10, wherein the display control unit performs the changing of the arrangement of the images before the operation tool or the finger reaches the overlapping image, and performs the changing of the arrangement of the images before the pointer reaches the overlapping image.

12. An information processing apparatus comprising:
    a display configured to display images; and
    at least one processor configured to execute:
      a receiving unit that receives a selection, by an operator, of one of the images displayed on the display;
      a specification unit that specifies a position on the display to which a gaze of the operator is directed; and
      a display control unit that moves an image, from among displayed images, which is determined to be adjacent to the position that is specified by the specification unit,
    wherein the display control unit moves the image in a direction away from the specified position, and
    wherein the position on the display is a position that does not overlap any of the images displayed on the display.

13. The information processing apparatus according to claim 12, wherein the display control unit moves the image in the direction away from the position to broaden a gap between two of the displayed images that are adjacent to each other with the position in between.

14. The information processing apparatus according to claim 13, wherein the display control unit moves both of the two of the displayed images in the direction away from the position to broaden the gap.

15. The information processing apparatus according to claim 12, wherein the display control unit moves the image in the direction away from the position, and moves, in the direction away from the position, a second one of the displayed images that is positioned on a downstream side of the one of the displayed images in the direction away from the position.

16. The information processing apparatus according to claim 12,
wherein the display comprises:
a display screen configured to display the images; and
a rim that surrounds the display screen, and
wherein, if the position specified by the specification unit is present between one of the displayed images and the rim, then the display control unit moves the one of the displayed images in the direction away from the position to broaden a gap between the one of the displayed images and the rim.

17. An image forming apparatus comprising:
at least one processor configured to execute an image forming unit that controls formation of an image on a recording material; and
a display configured to display an overlapping image including images which are overlapped and are mutually deviated;
wherein the at least one processor is further configured to execute:
a gaze detection unit that detects a gaze of an operator;
a motion detection unit that detects a motion that is made if the operator performs an operation on the overlapping image; and
a display control unit that increases a deviation between images among the images in response to both the gaze detection unit detecting that the gaze is directed to the overlapping image and the motion detection unit detecting the motion.

18. An image forming apparatus comprising:
at least one processor configured to execute an image forming unit that controls formation of an image on a recording material; and
a display configured to display images;
wherein the at least one processor is further configured to execute:
a receiving unit that receives a selection, by an operator, of one of the images displayed on the display;
a specification unit that specifies a position on the display to which a gaze of the operator is directed; and
a display control unit that moves an image, from among the displayed images, which is determined to be adjacent to the position that is specified by the specification unit,
wherein the display control unit moves the image in a direction away from the specified position, and
wherein the position on the display is a position that does not overlap any of the images displayed on the display.

19. A non-transitory computer readable medium storing a program for causing a computer to execute a process, the process comprising:
detecting a gaze of an operator as being directed to an overlapping image that is displayed on a display, the overlapping image including images which are overlapped and are mutually deviated;
detecting a motion that is made if the operator performs an operation on the overlapping image; and
increasing a deviation between images among the images in response to both the gaze being detected as being directed to the overlapping image and the motion being detected.

20. A non-transitory computer readable medium storing a program for causing a computer to execute a process, the process comprising:
receiving a selection, by an operator, from among images displayed on a display;
specifying a position on the display to which a gaze of the operator is directed; and
moving an image, from among the displayed images, that is determined to be adjacent to the position that is specified,
wherein the moving the image comprises moving the image in a direction away from the position that is specified, and
wherein the position on the display is a position that does not overlap any of the images displayed on the display.

* * * * *